Aug. 20, 1963 C. B. SAWYER 3,101,259
METHOD OF CONTROLLING DEPOSITION OF CRYSTALLINE
MATERIAL FROM SOLUTION ON A SEED BY USE
OF A TEMPERATURE PROFILE CURVE
Filed March 27, 1959 5 Sheets-Sheet 2

INVENTOR.
CHARLES B. SAWYER
BY
Oberlin, Maky, & Donnelly
ATTORNEYS

Aug. 20, 1963 C. B. SAWYER 3,101,259
METHOD OF CONTROLLING DEPOSITION OF CRYSTALLINE
MATERIAL FROM SOLUTION ON A SEED BY USE
OF A TEMPERATURE PROFILE CURVE
Filed March 27, 1959 5 Sheets-Sheet 4

INVENTOR.
CHARLES B. SAWYER
BY
Oberlin, Maky, & Donnelly
ATTORNEYS

3,101,259
METHOD OF CONTROLLING DEPOSITION OF CRYSTALLINE MATERIAL FROM SOLUTION ON A SEED BY USE OF A TEMPERATURE PROFILE CURVE
Charles B. Sawyer, Cleveland Heights, Ohio, assignor to Sawyer Research Products, Inc., Eastlake, Ohio, a corporation of Ohio
Filed Mar. 27, 1959, Ser. No. 802,479
6 Claims. (Cl. 23—301)

The present invention relates to the production of artificial crystals and, more particularly, to a method and apparatus for improving the growth of pegmatitic crystals of high quality.

The present method and apparatus are adapted for artificially producing various crystals, usually oxides, such as beryllium oxide and aluminum oxide. However, the invention is particularly adapted for the production of pegmatitic crystals, notably quartz crystals, and therefore for convenience of disclosure will be described in connection with such crystals. Quartz crystals are becoming increasingly important commercially not only for optical purposes but because they possess the peculiarity of generating an electric potential when subjected to mechanical stress and, conversely, exerting a mechanical stress when subjected to an electric potential.

In the usual manner of artificially growing quartz crystals, a nutrient solution bathes a seed crystal either by mechanically induced means and/or by thermally induced means. The nutrient solution may comprise an aqueous alkaline solution of a siliceous material, such as pure natural quartz, and nurtures the growth of the seed by gradual deposition of the siliceous material on the seed crystal. In the usual operation, the bathing of a seed crystal by the nutrient solution takes place at rather high pressures such as 8,000 p.s.i. and at elevated temperatures such as 350° C. It is accordingly necessary to confine the seeds and mother solution in an airtight autoclave or bomb during crystal growth.

The rate of crystal growth under the best known operating conditions is agonizingly slow. Moreover, the growing process is most sensitive and susceptible to many factors. For instance, crystals are often found to have "blue haze" which is a faint blue milkiness visible only under intense illumination and also known as the Tyndall effect. "Blue haze" is caused by scattered microscopic inclusions of roughly two microns in diameter, judging by their Tyndall scattering pattern. These inclusions are not otherwise identified but are suspected to be inclusions of liquid. A further defect often found in such crystals is crevicing. Crevices are defects resembling small cracks in appearance and are thought to be caused by local failures of growth producing small, narrow voids. Attempts to accelerate crystal growth as by raising the operating temperature or by increasing the molarity of the siliceous material in the nutrient solution seem to make such defects more pronounced.

Temperature determinations and/or control of various parts of the autoclave is most important to a satisfactory operation. Standard thermocouples have been used at vertically spaced areas along the outer side wall of an autoclave, and while temperature indications obtained by such thermocouples are helpful such indications are not sufficiently accurate for the fine degree of control desired. In such a situation, the thermocouples are influenced by the temperature of the wall of the autoclave. Thermocouples stationed about the lower portion of an autoclave where heat is normally flowing into the structure give temperature indications higher than those actually existing; whereas thermocouples stationed about the upper portion of an autoclave where heat is radiating outwardly give temperature indications lower than those actually extent. There is also a reduced and delayed response to momentary variations in the nutrient solution temperature when the thermocouples are placed along the wall of an autoclave due to the proximity of the large mass of the autoclave wall itself.

On the other hand, it is not feasible to allow a thermocouple or thermocouple well to protrude through the autoclave side wall and into the autoclave chamber, because the thermocouples and wells would then interfere with the charging or removing of autoclave equipment, such as the supply basket, seed rack, and the like.

Moreover, an autoclave must be operated during a run so that spontaneous nucleation, with accompanying crystallization in places other than on the seeds, is held to a minimum. This again means temperature control. When nucleation with growth takes place, it may impede the removal of the seed rack and other equipment, or if it takes place on an exchange plate, hereinafter more fully described, it may affect circulation of the nutrient solution itself with a corresponding loss of control.

Ordinarily, the nutrient solution floods over the seed crystal in repetitious waves, as by the rocking arrangement disclosed in Sobek et al., United States Patent No. 2,675,303; or the nutrient solution is allowed to bathe a seed or seeds wholly by thermal currents in an unimpeded manner as in Buehler United States Patent No. 2,785,058. By still another technique, a nutrient solution has been actually projected from a source onto a seed crystal as through a funnel-shaped transfer medium.

In addition to the foregoing, there are still other problems affecting crystal growth on a commercial scale where a large family of crystals may simultaneously be grown. For example, as the limiting rate of growth for high quality crystals is approached, crystal growth becomes so susceptible to even slight changes in operating conditions that it is difficult to obtain reproducible results in consecutive runs. Consequently, under commercial conditions, the results from run to run contain a degree of uncertainty and some wastage almost inevitably results. Further, within a single run, the crystals do not grow uniformly so that even though some crystals are below size expectations, the run must be stopped to avoid the larger crystals from growing still larger and welding or growing into adjoining crystals.

I have now developed a method and apparatus for growing crystals and especially quartz crystals which are of high qualtity and free to a remarkable extent of the defects mentioned. In accordance with the present invention I preferably employ in one form a vertical autoclave having a tandem two chamber construction, one chamber being used for the dissolution of the feed material and the other chamber being used for the bathing and growth of the seed crystals. In order more accurately to ascertain the temperatures within each of the two chambers in a manner free of the influence and substantial modifying effect of the walls of the autoclave chambers, I form an isolated zone by means of a hollow member or well substantially axially or centrally of the autoclave. The well is sealed from the pressure of the chambers and exposed to the atmosphere exteriority of the autoclave. In this manner, thermal sensing means may be positioned anywhere within the well during actual operation of the autoclave and sense areas of either chamber. This permits accurate determination of a temperature profile of the entire length of the autoclave and provides an indication of temperature fluctuations due to the currents and surges within the autoclave.

Further and preferably in addition to the above, instead of rather indiscriminately flowing or projecting the nutrient solution from the first chamber to the second, I provide each chamber with its own independent circulation which is not dynamically coupled to the other while simultaneously providing an unchannelized infiltration of the nutrient solution therebetween. There results by means of this technique a controlled exchange between the two regions. This provides better mixing and more nearly constant conditions without interfering with the inertia of the natural thermal currents established in each region. When a central or axial well is used in this instance, I can also thermally sense the temperatures simultaneously in each of the two regions, so as to obtain directly the temperature difference or drop between the regions. This direct measurement of the all important temperature difference between the two chambers or regions is thus not complicated or made inaccurate by independently determining the two actual temperatures of the regions and then subtracting one from the other.

It is, therefore, a principal object of the present invention to provide an improved method and apparatus for producing artificial crystals.

Another object is to provide such a method and apparatus for growing pegmatitic crystals of high quality.

A further object is to provide such a method and apparatus for growing all the pegmatitic crystals of a family or batch of such crystals at a substantially uniform rate.

A still further object is to provide a method and apparatus for growing quartz crystals that are substantially free of the Tyndall effect and crevicing.

A still further object is to provide a method and apparatus for growing quartz crystals wherein a nutrient solution is exchanged between a supply region and a seed-growing region in an unchannelized infiltration, and the temperature difference between such regions is sensed at areas substantially centrally of such regions.

Other objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In carrying out the present invention, I provide a mineral supply or a mineral-dissolving chamber and a seed-growing chamber arranged in communication with each other. A hollow elongated member which serves as a well extends through both chambers free of contact with the walls thereof. The well is sealed from the pressures of the chambers but is open and accessible at least at one end. Suitable thermal sensing means such as conventional thermocouple leads are insertable through this open end. By simultaneously noting the extent of the entry of the thermocouple leads into the well and the indicated temperature at that time, the temperature of any portion of the autoclave along the well is readily determined free of any modification or influence by the side walls of such chambers.

In another form of the invention employing the described thermocouple well, I separate the mineral-dissolving and seed-growing chambers by means providing for a controlled unchannelized exchange of a nutrient solution from one chamber or region to the other. Thus, each of such regions contains a nutrient solution adapted for circulation therein substantially independently of the solution circulated in the other region. While such an arrangement provides improved growth of artificial crystals, it inherently results in a temperature difference or drop from one chamber to the other, the extent of which is critically important to the proper growth of crystals of improved qualtity. In this form of the invention, I therefore use a differential thermocouple within the defined well to determine directly and accurately the extent of such temperature drop in order to determine if temperature changes in the operation of the autoclave are required.

In practicing the invention including use of either of the two previously described forms of the invention, the hollow elongated member or well may take several forms. Although a preferred installation of the well is illustrated in the drawings and described in connection therewith, it is understood that the well may be stationed anywhere within the autoclave or chambers thereof as long as mechanical contact with the walls of the autoclave or chambers is avoided in order to minimize the thermal influence thereof. Preferably, I station the well substantially centrally of the autoclave. Further, it is possible to use a plurality of wells, for example in juxtaposed or parallel relation, which are positioned within the autoclave to avoid contact with the chamber walls as described.

It is necessary to seal the well or wells from the pressure of the autoclave or chambers. To accomplish this, the well may have a sealed end terminating in one chamber; or a well may extend entirely through the autoclave with proper pressure seals at the points of entry and exit into and from the autoclave; or a U-shaped or "hairpin" well may be employed with both ends extending exteriorly of the autoclave. Of course, one end of the well must be open in order to receive the thermal sensing means.

Preferably, the two regions are vertically superposed in tandem fashion, so as to aid in the exchange of the stronger and weaker solutions between the described regions by hydrothermal currents. By a "strong solution" is meant that nutrient liquid which effects the transfer of the siliceous material, in the case of quartz crystals and the described vertical arrangement, from the lower region to the upper region by dissolving the material in the mineral-dissolving region and then depositing such material on the seed crystals in the seed-growing region. In contrast, the "weak solution" moves from the upper region to the lower region. Preferably also, the temperature in each region is substantially constant throughout the bath of liquid circulation therein. However, there is a rather sharp temperature drop between such regions, the lower temperature being in the seed-growing region. This condition not only provides the thermal potential which forces the infiltration of the solution of the mineral-dissolving region into the seed-growing region and vice versa, but it causes the solution to become supersaturated within the latter region so that deposition of the solute is readily accomplished.

One means of effecting the unchannelized exchange of nutrient solution between the two described regions is by use of a separating member which defines on opposite sides thereof the mineral-dissolving region and the seed-growing region. Although the central thermocouple well herein disclosed and claimed may be used alone in an autoclave, it is preferred to use the axial well with such a separating member, because the advantages of each are then further enhanced by the other. The concept of a separating member which defines the described regions on opposite sides thereof is disclosed and claimed in my copending application, Serial No. 802,504, now Patent No. 3,013,867.

In practice, I prefer to use for the separating member a metal plate having a plurality of openings or apertures through which the nutrient solutions infiltrate in opposite directions. It will be understood that the paths of flow of the hydrothermal currents may vary in force and direction from time to time and also experience momentary fluctuations. However, the general direction of movement for the "strong solution" is thought to be primarily upwardly in the mineral-dissolving region along the walls of the autoclave (which are receiving heat energy), across the metal plate laterally of the autoclave while some of the solution simultaneously infiltrates into the seed-growing region through openings in the plate, and then downwardly of the mineral-dissolving region substantially centrally thereof. The direction of movement of the "weak solution" is thought to be downwardly in the seed-growing region along the walls of the autoclave (which are radiating heat energy), across the metal plate laterally of the autoclave while some of the solution simultaneously infiltrates into the mineral-dissolving region through openings in the plate, and then upwardly of the seed-growing region substantially centrally thereof. Of course, the solution which infiltrates a given region from a companion region tends to join the general current flow of that region.

In order to achieve the infiltrating exchange of solution from region to region, I have found that the number and/or size of the openings in the separating member is important. If the sum of the openings is too large, the situation approaches that in which there is no plate, and the two regions have fairly free unlimited interchange such that they lose their identity as herein defined with loss of their separate dynamic movements. Also, too rapid an interchange of the nutrient solution may result in too high a supersaturation with nucleation of unwanted crystals. Further, under these conditions of free interchange, the differential temperature between a mineral-dissolving region and a seed-growing region may decrease uncontrollably. On the other hand, if there are too few openings or the openings are too small, the two regions become choked off from each other, and the amounts of both heat and solute carried by the hydrothermal solution into the seed-growing region seriously decrease.

I have found that crystals of satisfactory quality are produced within an acceptable period of time when the combined openings or apertures in the separating plate between the two defined regions constitute from about 2.5 to about 25 percent of the area through which the nutrient solution diffuses. Preferably, the combined openings should constitute about 2.5 percent to about 15 percent to produce crystals under better control. In practice, this area will normally be the horizontal section of an autoclave as hereinafter described in connection with FIGURE 1. The openings or apertures in a plate of the present invention may be of any configuration and need not form a uniform pattern over a plate although normally this is followed. Likewise, the openings in a given plate need not all be of the same configuration. Further, since autoclaves are usually of a circular cross-section to withstand the high pressures involved, an exchange plate of the present invention can not fit absolutely tightly against the walls of an autoclave, as sufficient clearance must be provided for insertion and withdrawal from the autoclave. Any annular area thus resulting is included in the cited percentage ranges of open area between the two regions.

Another manner of considering the nature of the operation of the exchange plate or baffle (and particularly accentuating its cooperable action with the described central axial well and differential thermocouple) is to note its control of the extent of temperature drop in passing from the mineral-dissolving region to the seed-growing region. Usually, only the mineral-dissolving region is heated as hereinafter noted. As the size and/or number of openings in a baffle plate are enlarged, there is less temperature drop due to the intervention of the plate, and the two regions have freer interchange of solution. If the size and/or number of openings are too small, the temperature drop may become excessive provided there is no compensating change in the heat loss from the upper chamber. Although crystal growth increases through "faster" hydrothermal currents, for reasons not fully understood, an extensive temperature drop frequently renders the previously described crystal defects more pronounced, including crevicing. In general, I have found that the temperature drop between the supply or mineral-dissolving region and the seed-growing region should ordinarily be within the range of about 4° C. to about 19° C. The central thermocouple well serves as an accurate check on this temperature drop. This temperature range is particularly useful when an aqueous solution of sodium carbonate forms the transverse solution for the quartz. However, other solutions may be used such as an aqueous solution of sodium hydroxide, and in such cases it may be desirable to operate with a higher temperature drop between the regions.

The exchange or infiltration plate also has the effect of rendering the temperature of the nutrient solution substantially constant in each region as is readily evident by taking thermocouple "readings" along the central well. For example, the mineral-dissolving region may have a temperature within the range of about 355° C. to about 375° C. and preferably about 364° C. to about 366° C.; and the seed-growing region may have a temperature within the range of about 335° C. to about 370° C. and preferably about 352° C. to about 355° C. Of course in a given situation, the temperature of the seed-growing region is always below that of the mineral-dissolving region. This result of a substantially uniform solution temperature throughout each region is particularly important in the seed-growing region, because a substantially uniform temperature throughout such region coupled with uniform saturation means uniform deposition of the solute and therefore uniform crystal growth. Similarly, the growth rate is most nearly related to the amount of supersaturation of the nutrient solution. If the supersaturation is maintained substantially constant over the surfaces of the growing crystals, the growth rate will be substantially constant, since the concentration of the nutrient solution is actually substantially constant from top to bottom within each region by means of the present invention.

Figure 1:
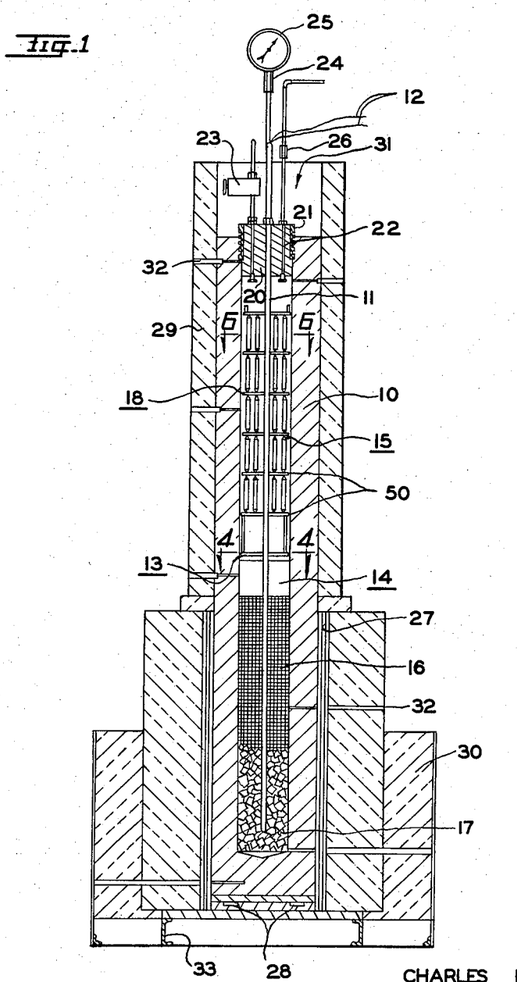
FIGURE 1 is a vertical section of an autoclave embodying the present invention and shows a full complement of grown crystals.

Referring to the drawing and particularly to FIGURE 1 thereof, one form of autoclave in which the present apparatus and method may be used includes a vertical tubular chamber 10 closed at the bottom and a hollow elongated well 11 which extends axially of the chamber throughout its length. The lower end of the well 11 is sealed from the pressure extant within the chamber 10, but the upper end extends above the chamber and is open to the atmosphere so as to receive thermocouple leads 12. The latter may be of a conventional type such as iron-constantan. An exchange plate 13 divides the chamber 10 into a supply or mineral-dissolving region or chamber generally indicated at 14 and a seed-growing region or chamber represented at 15. The chamber 10 may be fabricated from steel of high creep strength, such as steel containing 2.25 percent chromium and 1 percent molybdenum. Within the mineral-dissolving region 14 lies a wire mesh feed basket 16 containing crystalline quartz 17 which is to be dissolved to form a nutrient solution to be carried to the seed-growing region 15. The quartz may, for example, be Lascas grade natural quartz. A rack 18 supporting a plurality of seed crystals is stationed in the latter region.

A plug 20 tightly seals the upper end of the chamber 10 and has a wear-resistant collar 21 fixed to the plug 20 which threadably engages an upper terminus of the chamber. In addition to providing an airtight passage for the well 11, plug 20 has narrow passages 22 which extend through the plug 20 to expose suitable equipment to conditions extant within the interior of the chamber 10. Such equipment may include, for example, a bleeder valve 23, a surge check valve 24, a pressure gauge 25, a rupture disk 26, and other desired testing and control equipment.

Side and bottom strip heaters 27 and 28, respectively, are conventionally secured to the lower portion or mineral-dissolving region 14 of the chamber. These strip heaters are electrically energized as through potentiometer-type controllers operating in conjunction with a variable type transformer. In one installation, the vertical strip heaters 27 were strapped about the bottom third of the autoclave. These heaters were 28 in number, 42½ inches long, and were rated at 1500 watts. The heaters were manufactured by the Edward L. Wiegand Co. of Pittsburgh, Pennsylvania, and bore Wiegand type number SE-4301. These 28 strip heaters were divided into three nearly equal banks which could be connected either in delta for rapid heating or in the Y three phase connection for operation with an on-off temperature control. In the same installation, the bottom heaters 28 included two concentric circular heaters, one rated at 1050 watts (Wiegand type number A-80) and one rated at 1500 watts (Wiegand type number A-90). These heaters were operated continuously through a variable transformer which was adjusted to provide the desired bottom temperature.

Suitable high temperature insulation 29 encompasses the length of the chamber 10 and may comprise, for instance, magnesium oxide block insulation. Additional insulation 30 such as expanded mica (vermiculite) embraces the lower end in order economically to effect in combination with the strip heaters 27 and 28 a higher temperature at the end of the chamber 10 and thereby induce thermal currents in the nutrient solution which travel upwardly and longitudinally of the chamber toward the seed-growing region 12. It is advisable to minimize the effect of room temperature variations on the flow of heat leaving the autoclave which, of course, affects conditions extant within the autoclave, particularly the temperature differential between the defined regions. In practice, I provide insulation around the seed-growing region that can be varied according to need as indicated by thermocouple readings within the well 11, particularly by a differential temperature reading of the regions 14 and 15. For such insulation, asbestos sheets to which aluminum foil is cemented on one side are well suited. Under different running conditions, the number of sheets wrapped around the upper or seed end of the autoclave ranges between 2 and 18. These sheets of insulation were allowed to extend as much as six inches above the top of the autoclave so that if desired the resulting cavity above the top could be filled with mineral fibers or like insulation in order also to insulate the top of the autoclave. For example, the cavity 31 formed by the insulation 29 can be so filled to a desired extent.

A series of thermocouple wells 32 spaced vertically along the autoclave penetrate to desired areas of the chamber 10 to receive standard pencil thermocouples to indicate the temperatures at such areas in a known manner. However, the readings from these thermocouples are not to be compared in accuracy or effectiveness, with respect to a desired degree of operational control, to the readings obtained from within the well 11 in a manner herein described. Beams or channels 33 support the entire autoclave structure.

Figure 2:
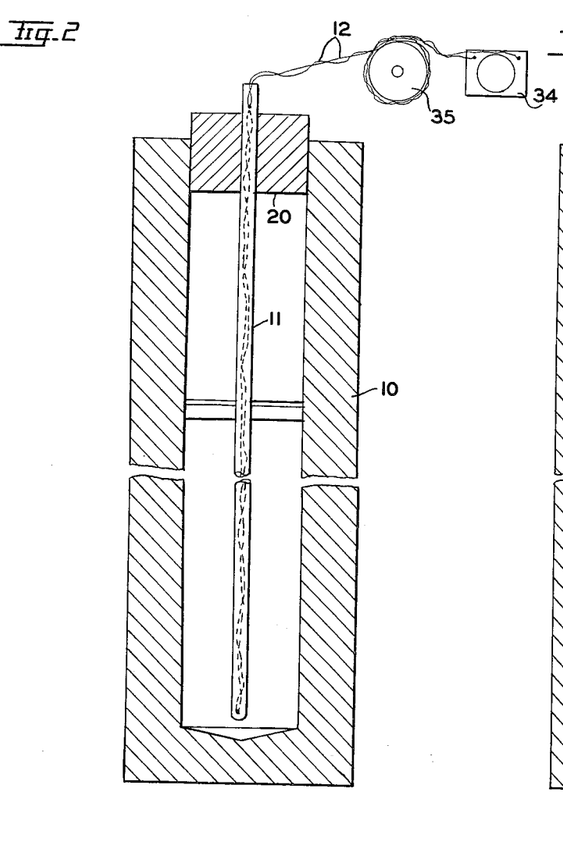
FIGURE 2 is a semi-diagrammatic, vertical section of an autoclave shell and shows the position of a central well and a thermocouple adapted for movement throughout the length of the well.
Figure 3:
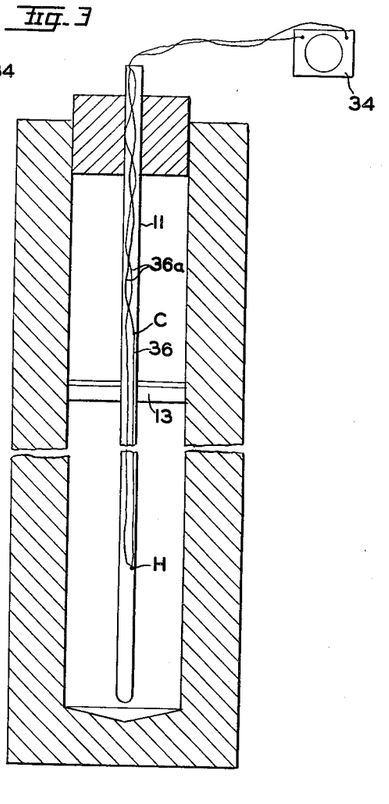
FIGURE 3 is a semi-diagrammatic, vertical section of an autoclave shell similar to FIGURE 2 but illustrates the installation of a differential thermocouple within the well for directly sensing the temperature difference between regions of the autoclave.

FIGURES 2 and 3 illustrate two ways in which the central thermocouple well may be used. In FIGURE 2, the thermocouple leads 12 are fixed to a standard temperature recorder 34, or other standard temperature indicator normally used with a thermocouple, and then looped around a stationary drum 35 from which the thermocouple leads are payed off or rewound. As shown, the joined ends of the lead are inserted through the open end of the well 11 and may sense any position within the chamber 10 from the top thereof as represented by the solid lines to the bottom thereof as represented by the dotted lines. The vertical position or elevation of a given temperature indication can be easily determined by noting the length of the leads which extends into the well at the time a "reading" is taken. Or the leads 12 can be marked themselves in a conventional unit of length to ascertain at a glance the depth of penetration of the joined ends into the well 11. By means of the embodiment of FIGURE 2, data for a temperature profile curve of the entire height of an autoclave are easily collected. The growth rate of a seed crystal is most nearly related to the amount of supersaturation of the nutrient solution within the seed-growing region. If this is maintained constant over the surfaces of a seed crystal within the temperature range of the growing crystal, as revealed by a temperature profile curve, the growth rate will be substantially constant.

Figure 9:
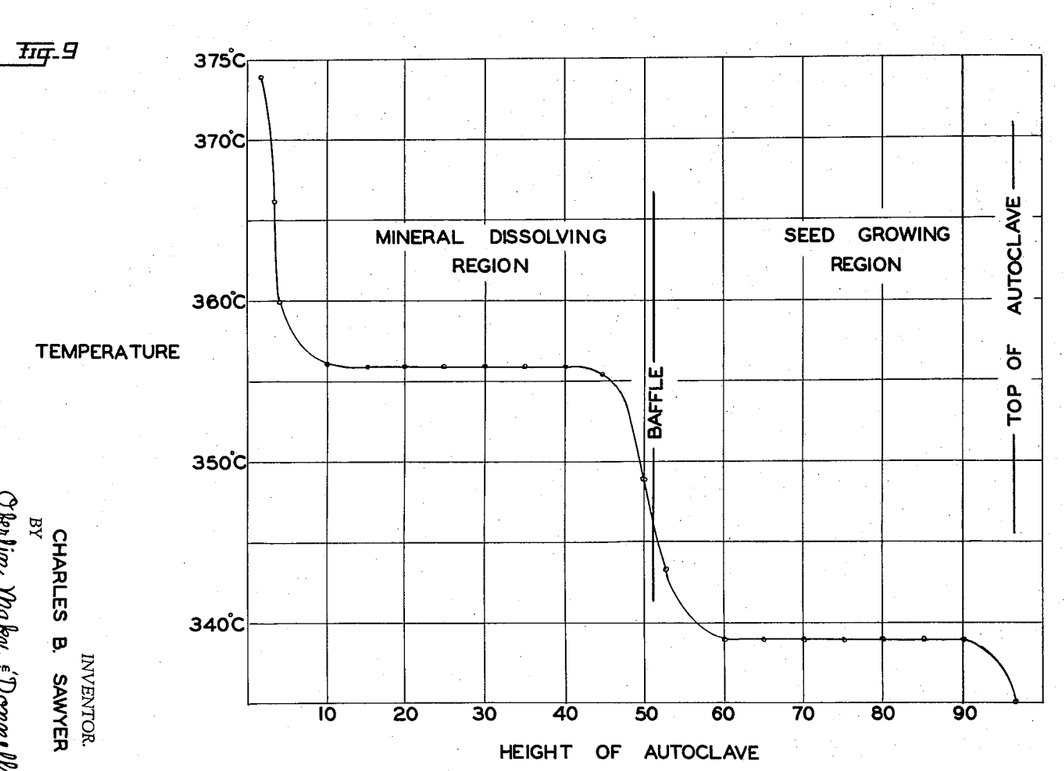
FIGURE 9 is a graph representing a temperature profile from the bottom to the top of an autoclave and based on data obtained by means of a structure such as that illustrated in FIGURE 2.

FIGURE 9 illustrates one such profile temperature curve. The accuracy afforded by the thermocouple well 11 in temperature determinations in combination with the baffle plate 13 shows that the latter renders the temperature of each chamber substantially constant throughout its length and this as noted particularly results in substantially uniform growth of any and all seed crystals in chamber 15. The temperature profile graph of FIGURE 9 is based on data observed from a pilot plant run of an autoclave having an internal height of 100 inches and an internal diameter of 9 inches. The exchange plate used in this autoclave had openings constituting five percent of its surface area, and the operating pressure was 8,000 p.s.i. Temperature readings were taken by a thermocouple moved along the well 11 as illustrated by FIGURE 2. The data show sharp temperature drops at the extreme ends of the autoclave as well as across the exchange plate, but the temperature in each of the two regions is remarkably constant. A temperature drop of 12° C. occurred across the exchange plate.

In the embodiment of FIGURE 3, the thermocouple leads are permanently installed in fixed positions. A lead 36 of constantan, for example, connects a hot junction H in the mineral-dissolving chamber and a cold junction C in the seed-growing chamber, the junctions preferably being selected about midway of the respective chambers. Leads 36a of iron connect the hot and cold junctions to a temperature recorder 34. In this manner, the temperature indicated or recorded is the actual temperature difference or drop between the regions 14 and 15. As previously described, this temperature drop is one of the most important process control parameters and can, for example, be a means of control of the crystal growth rate. In particular, the temperature drop reading can be used to determine whether insulation should be added or removed from the top of the autoclave, as from the cavity 31, depending on whether the temperature drop between the chambers is too great or too small, respectively. In the same manner, adjustments can be made on the heating strips 27 and 28. It appears that spontaneous nucleation in the seed-growing chamber does not normally take place when growth rates are sufficiently low to avoid the Tyndall effect. But nucleation may take place on the autoclave head or upper end if too much cooling is there permitted. Accordingly, I prefer to insulate this head to a degree determined by the temperature differential between chambers 14 and 15.

Figure 4:
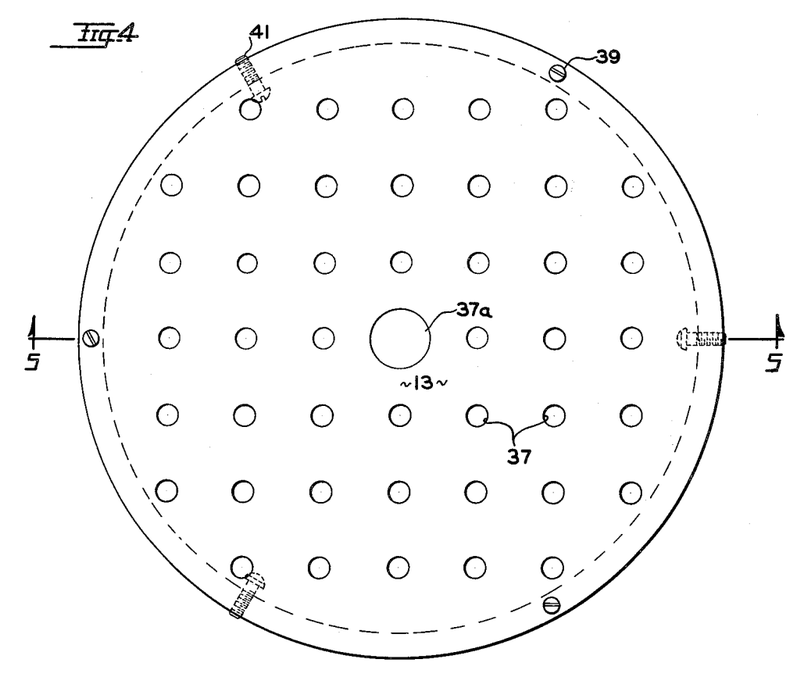
FIGURE 4 is a section of FIGURE 1 on the line 4—4 and illustrates an apertured or perforated plate which may be used.
Figure 5:
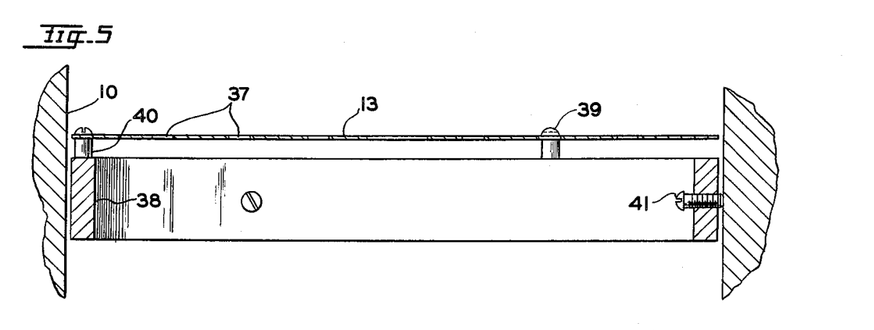
FIGURE 5 is a section of FIGURE 4 on the line 5—5.

The exchange or infiltration plate 13 has a plurality of openings or apertures 37 and is fixed to a support ring 38 by screws 39 which pass through intervening spacers 40. Set screws 41 engage threaded openings in the ring 38 and bear against the sides of the wall of the chamber 10 to hold the plate assembly in position. As previously noted, the openings 37 may be of variable size or number or configuration as long as they are distributed substantially over the plate and the total open area falls within the range previously designated. The central opening 37a must be sufficiently large to pass the well 11. In one particular installation for a pilot plant autoclave having an internal diameter of eight inches, a circular infiltration plate also eight inches in diameter of sixteen gauge low carbon steel was used. In addition to a central opening which was filled by a well like well 11, this plate had 45 holes uniformly distributed over its surface area. These holes were of the same diameter and comprised in total about 7.5 percent of the surface area of the plate.

A seed holder (FIGURES 7 and 8) which may be used comprises a pair of substantially parallel plates 42 and 43 adapted frictionally to engage the opposing minor surfaces 44 of a seed crystal 45. One of the plates 42 or 43 extends past each end of the seed crystal 45 and terminates in a narrower portion transversely of the plate which in the embodiment shown is a pointed triangular end 46. This structure facilitates mounting the seed holders in a seed rack as hereinafter described. The plates 42 and 43 may be made of iron or low carbon alloys of iron, although other materials such as silver, titanium, and even graphite have been used.

Figure 7:
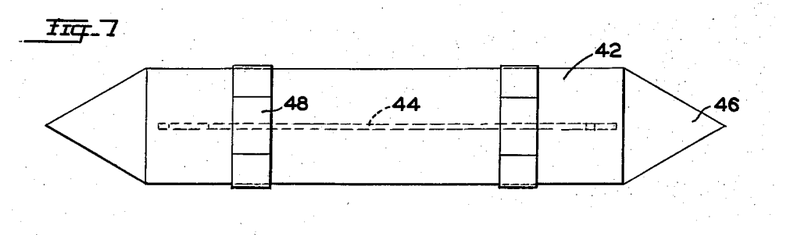
FIGURES 7 and 8 are plane and side views, respectively, of a seed holder and seed crystal which may be mounted in the rack of FIGURE 6.
Figure 8:
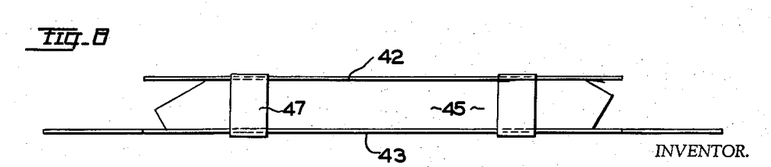

Tension means secure the plates 42 and 43 in relation to the seed crystal 45 and may take the form of one or more extensible metal bands 47 which snugly embrace the exterior of the plates 42 and 43 to clamp them in desired frictional engagement with the minor faces 44 or edges of the seed crystal 45. In order to impart a resilient tension to the assembled seed holder, one or more of the bands 47 may be offset as at 48 so that the band is somewhat stretched in tension upon being fitted about the plates and crystal.

Figure 6:
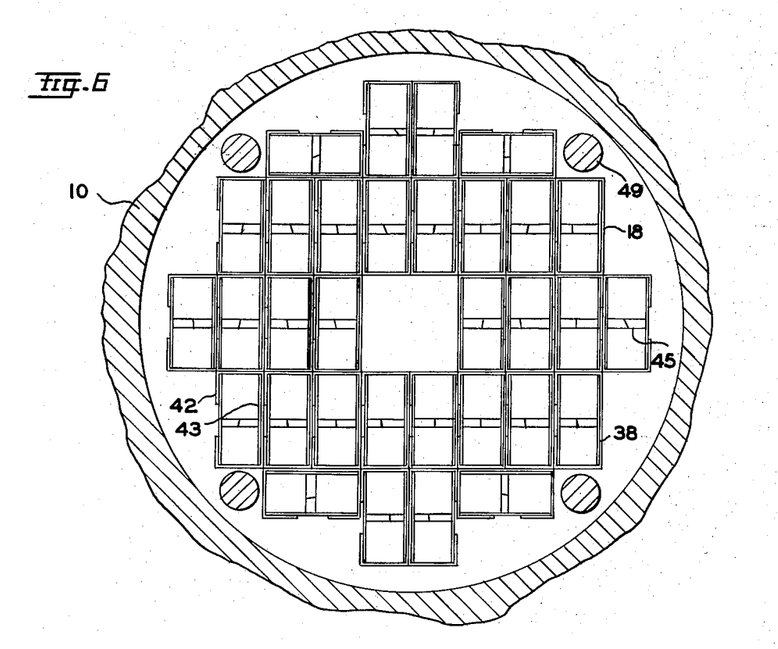
FIGURE 6 is a section of FIGURE 1 on the line 6—6 and shows the rack of the autoclave of FIGURE 1 when loaded with seed holders and seeds but before any crystal growth has taken place.

A family of such seed holders as shown in FIGURES 7 and 8 is simultaneously planted in the seed-growing region 15 of the chamber 10, and for this purpose the rack 18 of FIGURE 6 is used. The rack includes four corner steel posts 49, the lower ends of which may rest on the rim of the infiltration plate or baffle 13, to which vertically spaced plates 50 are suitably secured. The plates 50, which may form as many tiers as permitted by the size of the chamber 10 and the length of the seed holders, support the triangular ends 46 of the seed holder, or the ends of the seed crystals may be similarly directly supported. In order to provide for the circulation of a nutrient solution around and between the seed holders, each plate 50 comprises spaced-apart bars or slots (not shown), and each slat has chamfers or recesses which are vertically aligned with other chamfers on the facing side of another slat of an adjacent plate 50. Such chamfers thus readily receive the pointed ends 46 of a seed holder to position the seed crystals 45 vertically of the chamber 10. As indicated by FIGURE 6, the central area of the plates 50 is left open to pass the well 11. The bars or slats of each plate 50 are arranged to support the holders so as to dispose them in a substantially circular cross-sectional pattern since the chamber 10 likewise is of circular cross-section. The tension bands 47 of FIGURES 7 and 8 are U-shaped, the legs thereof being normally disposed somewhat inwardly. Accordingly, upon being slipped over the plates 42 and 43, the bands 47 are tensioned to hold the plates and seed crystal 45 in assembly.

It will be apparent that the use of the present method and apparatus is not critical to any particular set of operating conditions. However, the following data are submitted as exemplary of one autoclave and operating conditions therefor which may be used in carrying out the invention.

| | |
|---|---|
| Inside diameter | 8 inches. |
| Volume | 79 liters. |
| Design pressure | 10,000 p.s.i. |
| Design temperature | 450° C. |
| Steel | Croloy 2¼. |
| Closure | Modified Bridgeman. |
| Manufacturing method | Bored. |
| Inside height | 8 feet. |
| Outside height | 106⅝ inches. |
| Outside diameter | 14 inches. |

"Croloy" is a trade name for steel-containing chromium. By "Modified Bridgeman" is meant that conventional high pressure seal known in the art.

The operating conditions of a typical run for an autoclave of the type just described are:

| | |
|---|---|
| Solvent | 0.5 to 0.83 molar sodium carbonate in water. |
| Degree of initial filling | 80%. |
| Operating temperature of seed-growing region | 350° C. |
| Pressure | 10,000 p.s.i. |
| Number of seeds | 180 to 200 (depending on lengths). |
| Length of run (including clean out and restart) | 40 to 45 days. |
| Percent of open area of exchange plate | 7.5%. |
| Heat input | 4 kilowatts. |
| Quartz transport | Average 2 pounds per day. |

A normal procedure is to load the autoclave through the opening normally closed by the plug 20 and, after insertion of the well 11 and sealing, to commence heating the autoclave. When the temperature of the autoclave reaches about 150° C., the air within the autoclave is bled through the bleeder valve 23. Heating is then continued through the heater strips 27 and 28 until a control point is reached which may be about 365° C. for the mineral-dissolving region 14 as indicated by a thermocouple within the well 11. Subsequently, the temperature is maintained at the control point as by standard automatic electrical equipment. At the elevated operating temperature and pressure, the aqueous sodium carbonate solution dissolves some of the quartz crystal material in the basket 16 of the mineral-dissolving region 14 thus approaching saturation. Due to the controlled temperature differential between the seed-growing region and the mineral-dissolving region, there are upward thermal currents of solution into the seed-growing region 15. Here the solution is cooled and becomes supersaturated with respect to the dissolved quartz crystals, again because of the difference in temperature, and deposits the quartz on the seed crystals. During this time the temperature indications of the thermocouple or other thermal sensing means within the axial well 11 are not affected by the thermal flow of the hydrothermal solutions as is found to be the case when thermocouples are located within or adjacent the walls of an autoclave.

The progress of the run is determined by gammagraphs. The use of gamma rays and the like is the only known practical tool by which the crystal size can be measured non-destructively during crystal growth. Preferably, measurements are obtained by taking a gammagraph shadow picture of an "alley" between two vertical rows of crystals growing in the autoclave much in the same manner as a standard conventional X-ray plate is made. As growth continues, the width of this "alley" becomes smaller. For the purpose of taking a gammagraph, a 5 curie point gamma ray source (of cobalt 60) is carefully arranged in relation to the seed rack 18 to project a beam between the adjacent vertical rows of seeds and impinge upon a plate which is then developed. The beam is of sufficient width to cast a shadow from such adjacent rows which partially block it. This provides a close and quite satisfactory control of the size of the growing seeds.

However, the utility of gamma rays is not limited to photography. It is possible to use a variety of other detection or scanning devices, such as a Geiger counter.

When the seeds are grown to the desired size, as indicated, for example, by gammagraph measurements, the power is turned off. The autoclave is permitted to cool and then may be opened for removal of the grown crystals.

It will now be apparent that the present invention provides an improved method and apparatus for producing artificial crystals and, more particularly, for growing pegmatitic crystals, such as quartz crystals, of high quality. The present method and apparatus are also adapted for growing a family or batch of such crystals at a substantially uniform rate and free of such defects as the Tyndall effect and crevicing. By providing a well substantially centrally of a supply region and a seed-growing region, I am able to sense accurately the temperatures of these regions and especially the temperature drop between such regions.

Other forms embodying the features of the invention may be employed, change being made as regards the features herein disclosed, provided those stated by any of the following claims or the equivalent of such features be employed.

I therefore particularly point out and distinctly claim as my invention:

1. In the method of growing a crystal within a seed-growing chamber by a nutrient solution inter-exchanged with a communicating supply chamber; the steps of forming an isolated zone simultaneously extending through both chambers free of contact with the walls thereof, applying heat to such supply chamber while radiating heat from such seed-growing chamber to induce independent circulation of the solution in each chamber, exchanging the solution from each chamber to the other in an unchannelized flow, simultaneously passing thermal-sensing means through such zone to determine the temperatures at a plurality of points therein to determine a temperature profile in said chambers free of thermal influence of such walls of the chambers, and varying such application of heat to the supply chamber in accordance with the temperature profile data so obtained to provide conditions in such chambers conducive to desired crystal growth.

2. In the method of growing a pegmatitic crystal within an autoclave having baffle means dividing the autoclave into a seed-growing chamber disposed above a mineral-dissolving chamber and containing a nutrient solution; the steps of heating the mineral-dissolving chamber to induce vertical circulation of such solution therein and produce a substantially uniform temperature throughout such chamber, thermally insulating such seed-growing chamber for dissipating heat substantially uniformly therefrom to induce a vertical circulation of the solution therein independently of the solution circulation in the mineral-dissolving chamber and produce a substantially uniform temperature throughout such seed-growing chamber but at a temperature lower than the temperature of the mineral-dissolving chamber, using the resulting temperature drop between the chambers to flow the solution upwardly by convection into the seed-growing chamber, simultaneously interexchanging such solution from chamber to chamber in an unchannelized flow and at a rate insufficient to affect substantially the independent circulation in each chamber, concomitantly forming an isolated zone throughout such chambers free of contact with the walls thereof and extending through both chambers, passing thermal-sensing means throughout such zone to determine the temperatures at a plurality of points in each of such chambers spaced along the zone and thereby define a temperature profile curve through both chambers and across the baffle means in a manner free of thermal influence of walls of such chambers, and then varying the extent of such heating step in accordance with the temperature profile curve so obtained to provide conditions in such chambers conducive to desired crystal growth.

3. The method of claim 2 wherein such nutrient solution is an aqueous solution of sodium carbonate, and further including the step of varying the heating of such mineral-dissolving chamber in accordance with such temperature profile data to maintain such temperature drop within the range of about 4° C. to about 19° C.

4. The method of claim 2 further including the step of varying the heating of such mineral-dissolving chamber in accordance with such temperature profile data to maintain the temperature of the mineral-dissolving chamber within the range of about 355° C. to about 375° C. and to maintain the temperature of the seed-growing chamber within the range of about 335° C. to about 370° C.

5. In the method of growing a pegmatitic crystal within an autoclave having baffle means dividing the autoclave into a seed-growing chamber disposed above a mineral-dissolving chamber and containing a nutrient solution; the steps of heating the mineral-dissolving chamber to induce vertical circulation of such solution therein and produce a substantially uniform temperature throughout such chamber, thermally insulating such seed-growing chamber for dissipating heat substantially uniformly therefrom to induce a vertical circulation of the solution therein independently of the solution circulation in the mineral-dissolving chamber and produce a substantially uniform temperature throughout such seed-growing chamber but at a temperature lower than the temperature of the mineral-dissolving chamber, using the resulting temperature drop between the chambers to flow the solution upwardly by convection past the baffle means into the seed-growing chamber, simultaneously interexchanging such solution from chamber to chamber in an unchannelized flow and at a rate insufficient to affect substantially the independent circulation in each chamber, concomitantly forming an isolated zone throughout such chambers free of contact with the walls thereof and extending through both chambers, passing thermal-sensing means throughout such zone to determine the temperatures at a plurality of points in each of said chambers spaced along the zone and thereby define a temperature profile curve through both chambers and across the baffle means in a manner free of thermal influence of walls of such chambers, and then adjusting the degree of such insulating step in accordance with the temperature profile curve so obtained to vary the amount of heat so dissipated and produce conditions in such chambers conducive to desired crystal growth.

6. In the method of growing a quartz crystal within an autoclave having baffle means dividing the autoclave into a seed-growing chamber disposed above a mineral-dissolving chamber and containing a nutrient solution; the steps of heating the mineral-dissolving chamber to induce vertical circulation of such solution therein and produce a substantially uniform temperature throughout such chamber, thermally insulating such seed-growing chamber for dissipating heat substantially uniformly therefrom to induce a vertical circulation of the solution therein independently of the solution circulation in the mineral-dissolving chamber and produce a substantially uniform temperature throughout such seed-growing chamber but at a temperature lower than the temperature of the mineral-dissolving chamber, using the resulting temperature drop between the chambers to flow the solution upwardly by convection past the baffle means into the seed-growing chamber, simultaneously interexchanging such solution from chamber to chamber in an unchannelized flow and at a rate insufficient to affect substantially the independent circulation in each chamber, concomitantly forming a single isolated zone throughout such chambers free of contact with the walls thereof and extending through both chambers, passing thermal-sensing means throughout such zone to determine the temperatures at a plurality of points spaced in each of such chambers along the zone and thereby define a temperature profile curve through both chambers and across the baffle means in a manner free of thermal influence of walls of such chambers, and then varying the extent of such heating and insulating steps in accordance with the temperature profile curve so obtained to provide a temperature in the mineral-dissolving chamber within the range of about 355° C. to about 375° C., a lower temperature in the seed-growing chamber within the range of about 335° C. to about 370° C., and a temperature drop between such chambers within the range of about 4° C. to about 19° C.

References Cited in the file of this patent

UNITED STATES PATENTS

| | | |
|---|---|---|
| 2,459,869 | Christensen | Jan. 25, 1949 |
| 2,484,829 | Holder | Oct. 18, 1949 |
| 2,657,122 | Chandoye | Oct. 27, 1953 |
| 2,675,303 | Sobek | Apr. 13, 1954 |
| 2,785,058 | Buehler | Mar. 12, 1957 |
| 2,890,939 | Rarich | June 16, 1959 |
| 2,895,812 | Kohman | July 21, 1959 |

FOREIGN PATENTS

| | | |
|---|---|---|
| 682,203 | Great Britain | Nov. 5, 1952 |